US009472009B2

(12) United States Patent
Bostick et al.

(10) Patent No.: US 9,472,009 B2
(45) Date of Patent: Oct. 18, 2016

(54) DISPLAY OF CONTEXT BASED ANIMATED CONTENT IN ELECTRONIC MAP

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 14/595,589

(22) Filed: Jan. 13, 2015

(65) Prior Publication Data
US 2016/0203626 A1    Jul. 14, 2016

(51) Int. Cl.
| G09G 5/00 | (2006.01) |
| G06T 11/60 | (2006.01) |
| G06K 9/00 | (2006.01) |
| G06K 9/46 | (2006.01) |
| H04N 5/265 | (2006.01) |
| G06T 13/80 | (2011.01) |

(52) U.S. Cl.
CPC .......... *G06T 11/60* (2013.01); *G06K 9/00476* (2013.01); *G06K 9/4604* (2013.01); *G06T 13/80* (2013.01); *H04N 5/265* (2013.01)

(58) Field of Classification Search
None
See application file for complete search history.

(56) References Cited

U.S. PATENT DOCUMENTS

| 7,082,572 B2 | 7/2006 | Pea et al. | |
| 2008/0158256 A1* | 7/2008 | Russell | G06T 7/0026 345/629 |
| 2011/0078623 A1 | 3/2011 | Liu et al. | |
| 2011/0161861 A1 | 6/2011 | Abramson et al. | |
| 2012/0226531 A1 | 9/2012 | Lee et al. | |
| 2012/0306847 A1* | 12/2012 | Lim | G06K 9/00744 345/418 |
| 2013/0321257 A1* | 12/2013 | Moore | G06F 3/0481 345/156 |

FOREIGN PATENT DOCUMENTS

| WO | WO01/97120 A1 | 12/2001 |
| WO | WO2013/016219 A1 | 1/2013 |

OTHER PUBLICATIONS

Concolato et al, Design of an Efficient Scalable Vector Graphics Player for Constrained Devices, Apr. 15, 2008, IEEE.
(Continued)

*Primary Examiner* — Martin Mushambo
(74) *Attorney, Agent, or Firm* — Patrick J. Daugherty; Driggs, Hogg, Daugherty & Del Zoppo Co., LPA

(57) ABSTRACT

Aspects provide for selection and display of context-based animated objects and streaming video content display within an electronic map presentation. Animated content data collected from network data sources includes live-action video or animation representations of the location-based user activity. Location context data is extracted from the collected animated content data that identifies a geographic location of a user activity depicted within the animated content data live-action video or animation representations. Boundaries of an area within an electronic cartographic map are correlated with the identified geographic location of the activity, as well as with a type of the activity depicted within the live-action video or animation. The correlated boundaries are stored for use in plotting locations of the live-action video or animations within presentations of the electronic cartographic map, at the correlated area boundaries.

20 Claims, 4 Drawing Sheets

(56) References Cited

OTHER PUBLICATIONS

Disclosed Anonymously, Method and System for Identifying Objects of a Media Stream in Real-Time to Augment the Media Stream, Sep. 25, 2013, IP.com Prior Art Database Technical Disclosure.

Disclosed Anonymously, Defined Time Line Based Context Aware Searched Information Display with Street View, Jan. 9, 2014, IP.com Prior Art Database Technical Disclosure.

E Ink Corporation, Applications of Electro-Optic Displays, Aug. 27, 2014, IP.com Prior Art Database Technical Disclosure.

* cited by examiner

DISPLAY OF CONTEXT BASED ANIMATED CONTENT IN ELECTRONIC MAP

BACKGROUND

"Electronic maps" are presentations generated by digital mapping (or digital cartography) applications. Collections of data are compiled and formatted into a virtual image presented on a programmable device display, often interactive with user inputs via graphical user interface (GUI) selection routines. Electronic maps use Global Positioning System (GPS) satellite network data (or other geographic data) to give representations of a particular geographic area in a user specified format. The generated maps convey desired information for use in navigating by car, foot, bicycle, boat, mass transit, etc., from one point to another, for example depicting scaled, accurate and detailed spatial relationships of road, waterway, town and other points of interest to each other. The technology also allows the calculation of distances and estimated travel times from once place to another.

Prior systems may augment conventional cartographic representations of geographic location data with additional data presentations. For example, Google Maps™ and Street View™ mapping services enable a user to transition within an electronic map presentation from an overhead, vertical perspective view of a cartographic representation of a geographic location to a horizontal perspective view of stored, historic photographic images of a selected geographic location. (GOOGLE MAPS and GOOGLE STREET VIEW are trademarks of Google, Inc. in the United States or other countries.) Systems may also embed business contact, ratings and advertising information within electronic map data, which may be revealed and published on a desktop display of a user in response to a user selection via a GUI selection routine.

BRIEF SUMMARY

In one aspect of the present invention, a method for selection and display of context-based animated objects and streaming video content display within an electronic map presentation includes collecting animated content data from one or more network data sources. The animated content data includes live-action video or animation representations of the location-based user activity. Location context data is extracted from the collected animated content data that identifies a geographic location of a user activity depicted within the live-action video or animation representations. Boundaries of an area within an electronic cartographic map are correlated with the identified geographic location of the activity, as well as with a type of the activity depicted within the live-action video or animation. The correlated boundaries are stored for use in plotting locations of the live-action video or animations within presentations of the electronic cartographic map, at the correlated area boundaries.

In another aspect, a system has a hardware processor in circuit communication with a computer readable memory and a computer-readable storage medium having program instructions stored thereon. The processor executes the program instructions stored on the computer-readable storage medium via the computer readable memory and thereby collects animated content data from one or more network data sources. The animated content data includes live-action video or animation representations of the location-based user activity. Location context data is extracted from the collected animated content data that identifies a geographic location of a user activity depicted within the live-action video or animation representations. Boundaries of an area within an electronic cartographic map are correlated with the identified geographic location of the activity, as well as with a type of the activity depicted within the live-action video or animation. The correlated boundaries are stored for use in plotting locations of the live-action video or animations within presentations of the electronic cartographic map, at the correlated area boundaries.

In another aspect, a computer program product for selection and display of context-based animated objects and streaming video content display within an electronic map presentation has a computer-readable storage medium with computer readable program code embodied therewith. The computer readable program code includes instructions for execution which cause the processor to collect animated content data from one or more network data sources. The animated content data includes live-action video or animation representations of the location-based user activity. Location context data is extracted from the collected animated content data that identifies a geographic location of a user activity depicted within the live-action video or animation representations. Boundaries of an area within an electronic cartographic map are correlated with the identified geographic location of the activity, as well as with a type of the activity depicted within the live-action video or animation. The correlated boundaries are stored for use in plotting locations of the live-action video or animations within presentations of the electronic cartographic map, at the correlated area boundaries.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
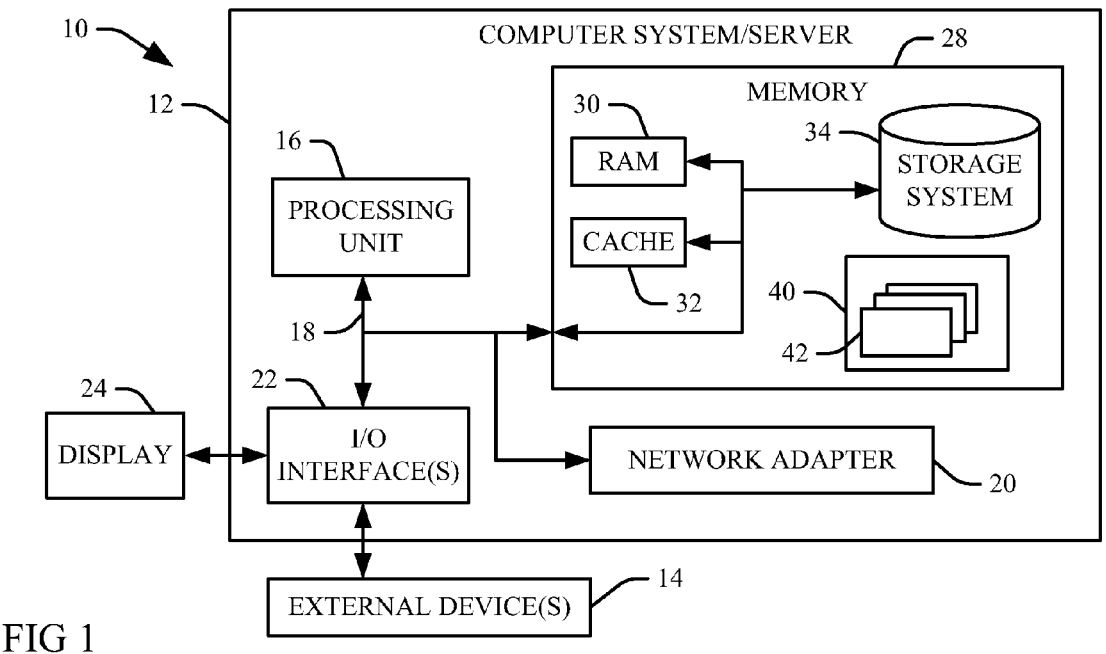
FIG. 1 depicts a cloud computing node according to an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
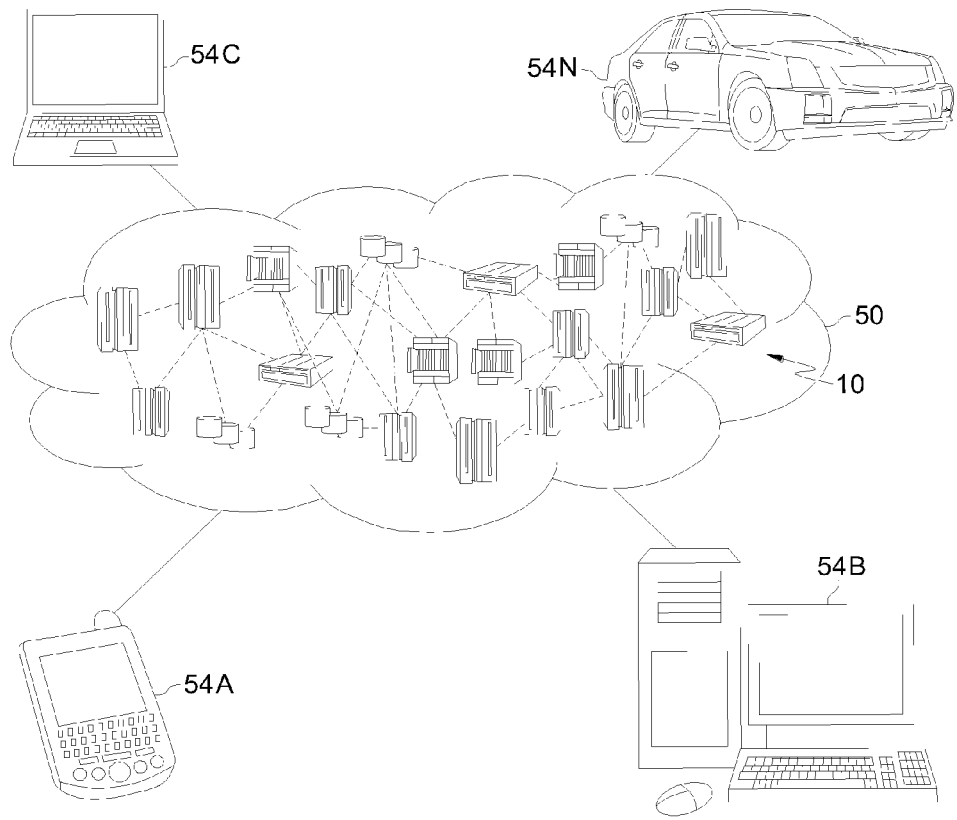
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
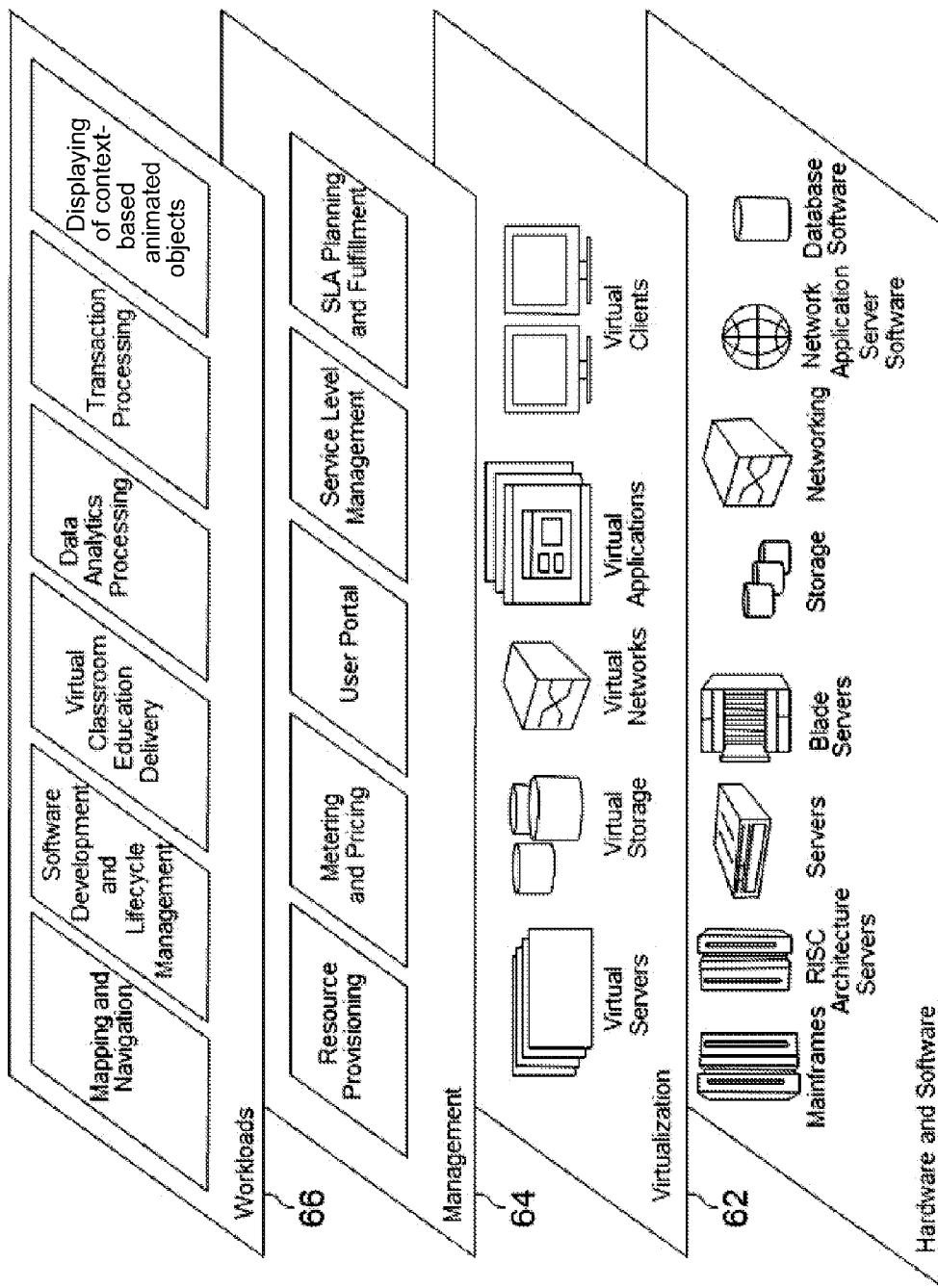
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and displaying of context-based animated objects and streaming video content display within an electronic map presentation (as described more particularly below).

In one aspect, a service provider may perform process steps of the invention on a subscription, advertising, and/or fee basis. That is, a service provider could offer to integrate computer readable program code into the computer system/server 12 to enable the computer system/server 12 to perform process steps of the invention. The service provider can create, maintain, and support, etc., a computer infrastructure, such as the computer system 12, bus 18, or parts thereof, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 12, from a tangible computer readable medium device 34; (2) adding one or more computing devices to the computer infrastructure 10; and (3) incorporating and/or modifying one or more existing systems 12 of the computer infrastructure 10 to enable the computer infrastructure 10 to perform process steps of the invention.

Figure 4:
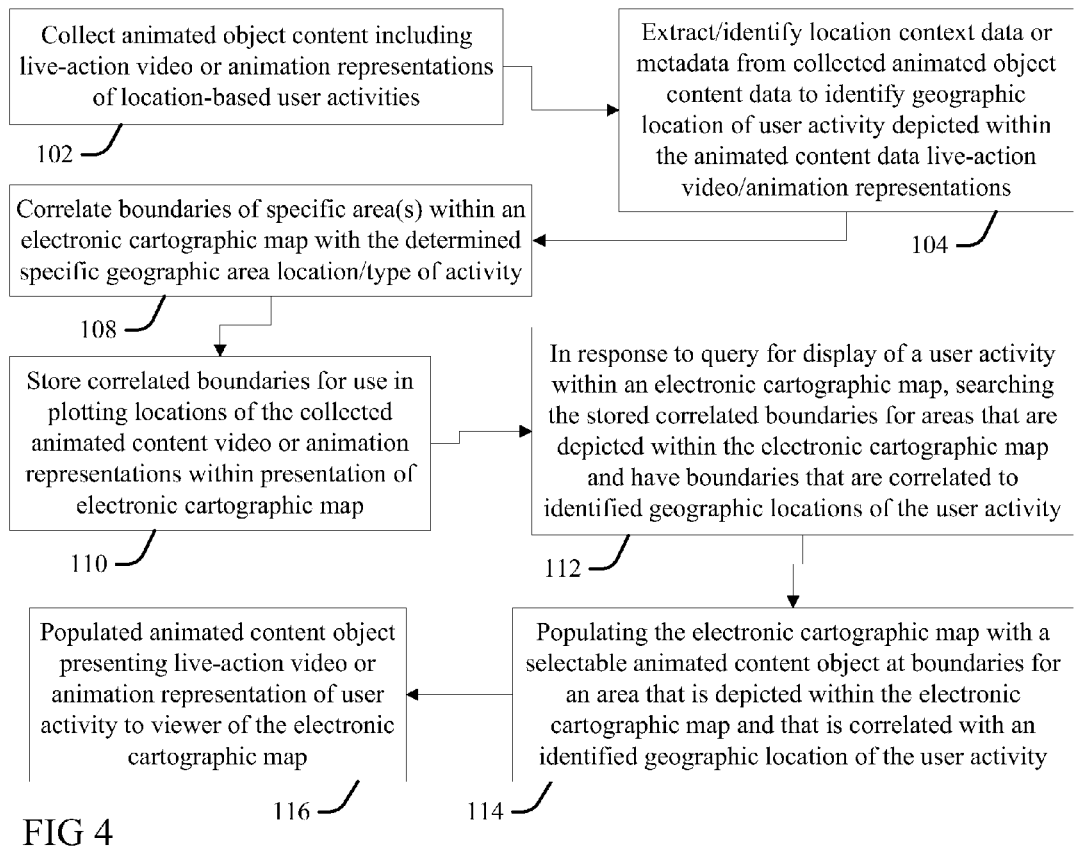
FIG. 4 is a flow chart illustration of a method or process according to the present invention for selection and display of context-based animated objects and streaming video content display within an electronic map presentation.

FIG. 4 illustrates a method or process of an aspect of the present invention for selection and display of context-based animated objects and streaming video content display within an electronic map presentation. At 102 a processor executes code (for example, code installed on a remote application server) and thereby collects data files and/or streaming video that includes live-action video or animation representations of location-based user activities, hereinafter sometimes referred to generically as "animated content." The animated content is collected for use in integration with cartographic presentations of a geographic area that are generated by mapping software applications, as is discussed with more detail below. The animated content is generally image data that changes over time to convey motion picture content depicting activities that a user may engage in at a specific location, and that may be depicted within cartographic presentations of an associated or relevant geographic area. Example animation or video stream images includes those of people playing golf at a hole of a golf course; rafting, kayaking, tubing or swimming on or in a river or other body of water; climbing on a rock face in a park, or on a rock wall located within a gymnasium or recreation center; sky diving, including through a region recognizable via visible landmarks seen about the sky divers; and still other activities amenable to viewing via captured video streams or animation representations will be apparent to one skilled in the art.

Animated content may also include still photos, text, and social network location and metadata (ratings and reviews, etc.), and may be collected from a variety of private or public domain data sources in communication with the processor. Sources include social community, forum or networks (hereinafter "social networks"). Illustrative but not exhaustive examples of social network sources include Wikipedia™, Facebook® and Twitter®, and still others will be apparent to one skilled in the art. (WIKIPEDIA is a trademark of the Wikimedia Foundation in the United States or other countries; FACEBOOK is a trademark of Facebook, Inc. in the United States or other countries; TWITTER is a trademark of Twitter, Inc. in the United States or other countries.).

At 104 the processor extracts or otherwise identifies location context data from the collected (gathered) animated content data that identifies a geographic location of a user activity depicted within the animated content data live-action video or animation representations. This step may include analyzing images via image recognition applications in order to detect images of activities that may be categorized (for example, Nordic skiing, alpine skiing, ice skating, rafting, hiking, etc.) to identify activities associated with identified location context data. The location context data is analyzed to find (determine) specific geographic area location or type of activity indicators: for example, the identity and location of the river seen in a rafting video, including the GPS (Geographic Positioning Satellite) coordinates of the section or portion of the river visible in the animated content, or metadata descriptions of the activity depicted therein (white water rafting, inner tubing, rock climbing, etc.).

At 108 the coordinates or boundaries of one or more specific and different or distinct locations within an electronic cartographic presentation map are correlated with the identified geographic locations of the user activities depicted within the animated content data live-action video or animation representations. The correlation may include matching geographic data such as GPS coordinates, or matching same or similar activity context data (for example, matching text data indicating the presence of a golf course or a rock climbing trail to animated content depicting golfing or rock climbing, respectively). The correlated boundaries of the distinct locations are stored at 110 for association with the collected animated content data (the live-action video or animation representations) in a cartographic map presentation of the distinct locations. More particularly, the cartographic map presentation is generated within a computer or other programmable device display by a mapping application, for example Google Maps™ though other mapping applications may generate the cartographic map presentation.

At 112, in response to a user query for display of the user activity within the electronic cartographic map, searching the stored correlated boundaries for areas that are depicted within the electronic cartographic map and have boundaries that are correlated to the identified geographic location of the user activity. The locations may thus be depicted within the map in correlation to the stored animated objects that include visual data streams or animations that visually depict activities of relevance to a context of the user query. The depicted locations include geographic features (bodies of water, mountain faces, hiking and biking trails, etc.), as well as street addresses of business establishments, building locations, parking lots, mass transit stops, etc., that are depicted within the map.

At 114 the map is populated with one or more selectable animated content objects at boundaries for areas that are both depicted within the electronic cartographic map and correlated with the identified geographic location of the user activity forming the basis or context of the query. The selectable animated content objects populating the map, each representative of results of filtered search via presentation of video or animation of underlying user activity available to user at correlated map location.

At 116 the populated animated content objects present live-action video or animation representations of said user activity to a viewer of the electronic cartographic map. The animated content objects may automatically display video stream or animated content presentations within sub-windows of frames within the map at 116 without requiring user selection, for example, at a pre-defined or default zoom level selected for conveying the video or animation data at a resolution that clearly conveys the activity to the user within the display settings of the electronic map presentation.

The objects presented at 114 may also be hypertext or icon objects (including animated icons) that evoke displays of video stream or animated content presentations in response to their selection via a GUI selection routine at 116 (for example, by navigating a mouse over the object and clicking, selecting the object with a fingertip via a touch screen device, etc.). Selection of the object at 116 may also evoke metadata associated with a correlated activity, such as provider identity information (street address, business name, hours and days of operation, telephone number or web address, etc.), social media rating and comments on the activity or provider, etc. In some aspects the display of video stream, animated content or associated metadata may be conditional upon or responsive to a user selecting an "Activity View" option, to reveal or evoke presentation of the desired motion picture or metadata.

Figure 5:
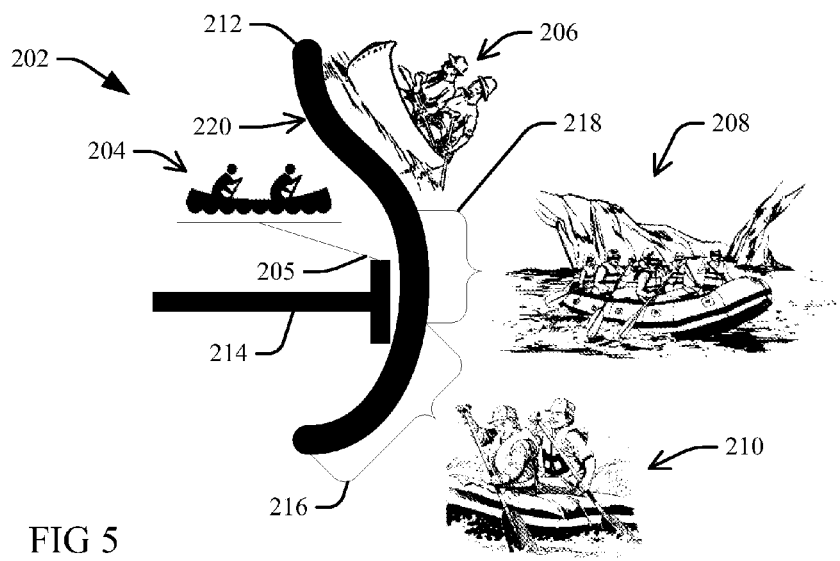
FIG. 5 is a graphical depiction of an example of populating an electronic map with animated content objects according to the present invention.

FIG. 5 illustrates an example of an electronic map 202 populated with animated content objects 204, 206, 208 and 210 according to the present invention, via the process of FIG. 4 discussed above. The execution of a query (at 112, FIG. 4) and result presentations (at 114 and 116, FIG. 4) may return and present all correlated locations and activities available within the boundaries of a presentation of the map 202 to the user via a GUI (for example, within the zoom view level of a window presenting the map). Correlations or presentments in satisfaction of the query may also be limited or filtered result to only those activities meeting an additional filtering condition, an activity interest specified as a pre-condition or preference of the user or indicated within historic activity data of the user, or a time constraint for performing the activity.

In the example of FIG. 5 the map 202 depicts a river 212 next to a street 214 that provides river access. An animated canoe icon 204 is called out from an address or other location along the road 214 (via the call-out pointer 205) and indicates to a user that canoes are available for rent, or that river access is available for canoe put in or pull out, at this call-out 205 location along the road 214.

Three different video image animation objects 206, 208 and 210 are provided that each include video streams of different, specific rafting or canoeing activities is available at different respective portions 216, 218 and 220 of the river 212. The video data may be acquired at the locations correlated to the respective area boundaries (portions) 216, 218 and 220, thereby providing the user with images of the actual river 212 as acquired at those areas. In some examples the location from which the video data is acquired is located within the correlated area boundaries. Alternatively, they may be collected and correlated to correspond to known river conditions of those respective portions 216, 218 and 220 as indicated by metadata, social network data, etc.

Thus, the video stream object 210 shows a two-person raft navigating challenging, technical rapids classified as level 5 or higher, in association with a bracket call-out 216 defining a first river portion. Another video stream object 208 shows a six-person raft navigating less challenging, rapids that classified as no higher than level 3, in association with a different bracket call-out 218 that defines another, second first river portion. Lastly, video stream object 206 is video of a two-person canoe showing canoeing over calm or peaceful water over a remaining portion 220 of the river 212. The respective depicted video streams are either acquired at these specific river sections 216, 218 or 210, or at another river or river portion having the same assessed rapid condition level known to persist at said river portions.

The differences in the size of the rapids and the violent or passive nature of the person activities depicted in each video stream 206, 208 and 210 inherently and quickly conveys to a user of the map 202 differences in the available activities. Thus, it may be readily apparent that rafting portion 216 is limited to adults or experienced rafters, due to the danger posed by the larger rapids, while the middle portion 218 maybe rafted safely (and via larger boats) by adolescents and non-experienced rafters. Further the calm waters of uppermost portion 220 (as oriented by the map 202 view, not the flow of the river 212) are amenable to canoeing activities by those who wish to avoid the rapids typical within the other portions 216 and 218.

The activities correlated and videos or animations used to represent them within presented electronic maps may be selected as a function of time in view of and collected metadata. More particularly, results returned in satisfaction of searching stored correlated boundaries for areas depicted within an electronic cartographic map and having boundaries correlated to the identified geographic locations of the user activities may be limited to those activities that occur during a specified time, time period or season. For example, the map view 202 of FIG. 5 may be generated for a specific time, time period or season for the river 212, such as a two-month period in the fall when an upstream dam release is scheduled to release enough water to generate class 5 and higher rapids in section 216, while diminish to no higher than class 3 rapids as the water continues to flow into the middle section 218.

Figure 6:
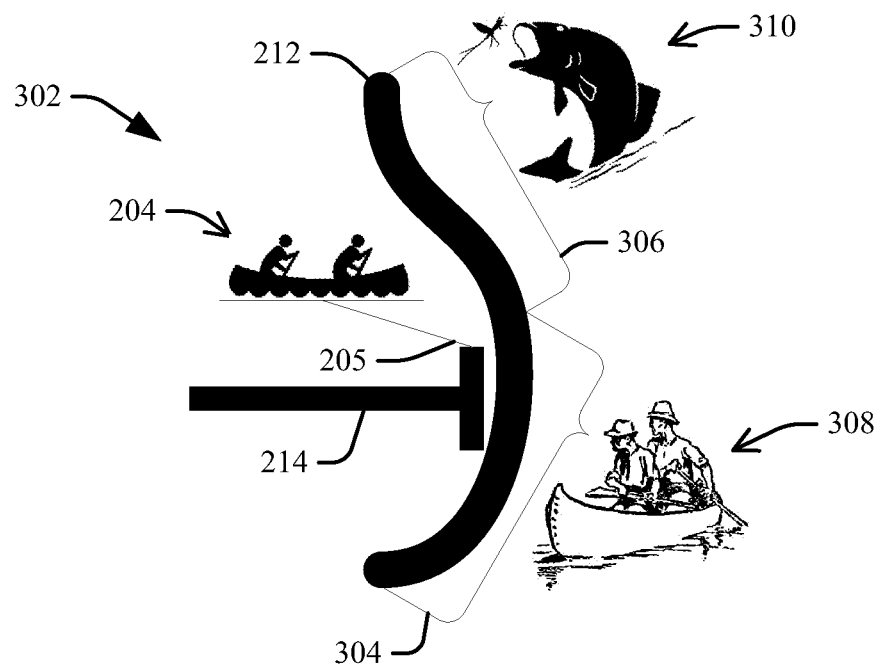
FIG. 6 is a graphical depiction of another example of populating an electronic map with animated content objects according to the present invention.

In contrast, FIG. 6 provides a cartographic depiction 302 of the same length of the river 212, but for a different time period, such as late summer when water levels are much lower. Accordingly, the length of the river 212 is now divided into two different portions 304 and 306. The lower view portion 304 includes all of portion 216 and part of middle portion 218 of the view of FIG. 5, but wherein the activity indicated as available at this time for this portion 304 is now canoeing rather than white water rafting, as indicated by the video object 308 that shows canoeing video acquired over this portion 304 at the time of the map 302 generation. Canoe rentals are still available at the same address or location along the road 214, as indicated by the animated canoe icon 204 called out via the call-out pointer 205. However, an upper river portion 306 (that includes a remainder of the middle portion 218 and the upper portion 220 of the view of map 202 of FIG. 5) is now closed to canoers but instead available to permitted fly fisherman, as indicated by the video stream 310 that depicts fly fishing for this time period.

Figure 7:
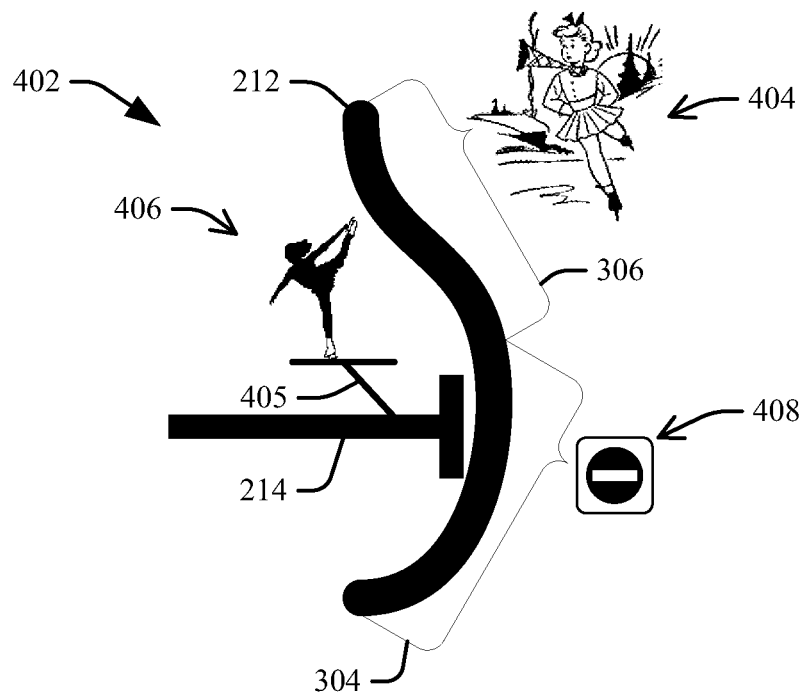
FIG. 7 is a graphical depiction of another example of populating an electronic map with animated content objects according to the present invention.

FIG. 7 provides another cartographic depiction 402 of the same length of the river 212, and at the same zoom level of views 202 (FIG. 5) and 302 (FIG. 6), but for a winter time period. Portion 306 is now available for ice skating activities, as indicated by the video stream 404 that depicts ice skaters enjoying this portion 306 of the river 212. Ice skate rentals are available at an address or location along the road called out via a call-out pointer 405 and indicated by an associated animation object 406 of an ice skater. The lower view portion 304 is now closed to ice skating or other recreational activities, as indicated by a closure icon 408 associated with bracket demarcation of the portion 304.

Time-based query filtering may limit result correlations or presentments to activities available at a current time of generation of a map presentment, or at another time specified by a user. Thus, the electronic cartographic map may be generated and presented to the viewer with the populated animated content object by depicting the boundaries for the area in correlation to identified geographic locations of the user activity at a time of season during which the user activity is available for participation by the user within the depicted boundaries. For example, a user planning a trip to the presented length of river 212 may specify the date of the trip, wherein one of the presentments 202, 302 and 402 are selected as corresponding to a season, date or date range that includes the specified time. Some aspects may identify, determine or project a time and date (or ranges thereof) that a user may physically navigate to locations within the generated map as a function of an activity attribute. Thus, a map search query input "X river skating," where "X" is the name of the river 212, may return presentation 402 of FIG. 7, optionally along with data presentment (voice, text, audio incorporated in the video object 404, etc.) that indicates the dates and times and that the activities are possible or offered (for example, "Skate rentals available at Jim's Barn Friday through Sunday from December 26 through March 5, call xxx-xxx-xxxx for details").

Further, user preferences associated with a user query (which may include historic searching and identification data) may also be used to filter query results used to generate map presentments to those activities that are appropriate to the user. Activities may be filtered to show only those that satisfy a query for activities as a function of an age or physical ability of the user. For example, recognizing that a prior map browser history of the user includes searching for white water rafting activities, or that the user has history of publishing photographs, text contents, videos, etc. of white water rafting activities to a social network account of the user, may cause aspect to choose (at 112 or 114) the presentment 202 of FIG. 5 for display to the user (as it is the only one that white water rafting activities, depicted by the animated content object 210). However, identifying the age of the user as too young for class 5 rapids may revise the presentment 202 to replace the white water rafting animation object 210 with the closure icon 408 (FIG. 7). Thus, any one of the plurality of possible animated content objects and icons 206, 208, 210, 308, 310, 404 and 408 that each represent different activities may be selected and presented with the same geographic location or boundary area, based on time or date or user preference inputs.

As illustrated above by the apportioning of the same length of river 212 into the different sets of river portions 216-218-220 and 304-306, aspects may identify property or map sub-sections having a variety of any defined boundary locations based on analysis of user generated data and the identified property, and thereby overlay appropriate animated objects or streaming video within map presentments. User's feedback can also be used for correcting the animated objects and streaming video for a given geography boundary.

Aspects identify activities and related contexts and boundaries of mapped geographic areas via analysis of geotagging data extracted from images, video, websites, SMS messages, QR Codes, RSS feeds, etc., (at 104, FIG. 4). Geotagging is a form of geospatial metadata that adds geographical identification metadata to photographs, video, and may include latitude and longitude coordinates, as well as altitude, bearing, distance, accuracy data, and place names. Thus, aspects may define the area boundaries as coextensive with and inclusive of a range of geotagging coordinates of pluralities of images of the collected animated content data that are acquired at the identified geographic locations of the relevant user activities. For example, the boundaries (span) of the portion 306 of the river 212 identified for fishing in FIG. 6 may be defined by a range of the geotagging coordinates of multiple fly fishing pictures taken on the river 212 and published to social media, wherein picture and video data collected (at 102, FIG. 4) have geotagging data locating them within this portion 306, and not within the other remainder portion 304.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for selection and display of context-based animated objects and streaming video content display within an electronic map presentation, the method comprising:
    collecting animated content data from a network data source, wherein the collected animated content data is selected from the group consisting of live-action video of a location-based recreational user activity, and animation representations of the location-based recreational user activity;
    extracting location context data from the collected animated content data, wherein the location context data identifies a geographic location of the recreational user activity that is depicted within the collected animated content data live-action video or animation representations;
    correlating boundaries of an area within an electronic cartographic map with the identified geographic location of the user activity and a determined type of the recreational user activity depicted within the collected animated content data live-action video or animation representations; and
    storing the correlated boundaries in a storage device for use in plotting location of the collected animated content data live-action video or animation representations of the recreational user activity at the correlated area boundaries within a presentation of the electronic cartographic map on a programmable device display screen.

2. The method of claim 1, further comprising:
    in response to a query for display of the recreational user activity within the electronic cartographic map, searching the stored correlated boundaries for areas that are depicted within the electronic cartographic map and have boundaries that are correlated to the identified geographic location of the recreational user activity;
    populating the electronic cartographic map with a selectable animated content object at the boundaries for the area that is depicted within the electronic cartographic map and that is correlated with the identified geographic location of the recreational user activity; and the populated animated content object presenting live-action video or an animation representation of the recreational user activity to a viewer of the electronic cartographic map, wherein the recreational user activity is selected from the group consisting of hiking, climbing, golfing, sky diving, skiing, skating, fishing, swimming, tubing, rafting, canoeing, kayaking and boating.

3. The method of claim 2, wherein the populated animated content object presents live-action video that was acquired at the identified geographic location that is correlated to the area boundaries, wherein the identified geographic location is located within the area boundaries.

4. The method of claim 3, further comprising:

defining the area boundaries as coextensive with and inclusive of a range of geotagging coordinates of a plurality of images of the collected animated content data that were acquired at the identified geographic location of the recreational user activity.

5. The method of claim 2, further comprising:

populating the electronic cartographic map with a plurality of different selectable animated content objects that comprises the selectable animated content object, wherein each of the plurality of different selectable animated content objects are populated at different boundaries for different areas depicted within the electronic cartographic map and that are correlated with different identified geographic locations of different user activities; and the populated plurality of different selectable animated content objects each presenting live-action videos of the different recreational user activities to the viewer of the electronic cartographic map.

6. The method of claim 2, further comprising:

limiting results returned in satisfaction of the searching of the stored correlated boundaries for areas that are depicted within the electronic cartographic map and have boundaries that are correlated to the identified geographic location of the recreational user activity to activities that occur during a specified time, time period or season.

7. The method of claim 2, further comprising:

generating the electronic cartographic map presented to the viewer with the populated animated content object to depict the boundaries for the area in correlation to the identified geographic location of the recreational user activity at a time of season during which the recreational user activity is available for participation by the user within the depicted boundaries.

8. The method of claim 2, wherein the step of populating the electronic cartographic map with the selectable animated content object further comprises:

filtering activities available to satisfy the selected recreational user activity as a function of an age or physical ability of the user.

9. The method of claim 1, further comprising:

integrating computer readable program code into a computer readable storage medium; and wherein a processor that is in circuit communication with a computer readable memory and the computer readable storage medium executes instructions of the program code integrated on the computer readable storage medium via the computer readable memory and thereby performs the steps of collecting the animated content data from the network data source, extracting the location context data from the collected animated content data, correlating the boundaries of the area within the electronic cartographic map with the identified geographic location of the recreational user activity and the determined type of the recreational user activity depicted within the animated content data live-action video or animation representations, and storing the correlated boundaries in the storage device.

10. A system, comprising:

a processor;

a computer readable memory in circuit communication with the processor;

a computer readable storage medium in circuit communication with the processor; and a display screen in circuit communication with the processor;

wherein the processor executes program instructions stored on the computer readable storage medium via the computer readable memory and thereby:

collects animated content data from a network data source, wherein the collected animated content data is selected from the group consisting of live-action video of a location-based recreational user activity, and animation representations of the location-based recreational user activity;

extracts location context data from the collected animated content data, wherein the location context data identifies a geographic location of the recreational user activity that is depicted within the collected animated content data live-action video or animation representations;

correlates boundaries of an area within an electronic cartographic map with the identified geographic location of the user activity and a determined type of the user activity depicted within the collected animated content data live-action video or animation representations; and stores the correlated boundaries in a storage device for use in plotting location of the collected animated content data live-action video or animation representations of the recreational user activity at the correlated area boundaries within a presentation of the electronic cartographic map on a programmable device display screen.

11. The system of claim 10, wherein the processor executes the program instructions stored on the computer-readable storage medium via the computer readable memory and thereby further:

in response to a query for display of the recreational user activity within the electronic cartographic map, searches the stored correlated boundaries for areas that are depicted within the electronic cartographic map and have boundaries that are correlated to the identified geographic location of the user activity;

populates the electronic cartographic map with a selectable animated content object at the boundaries for the area that is depicted within the electronic cartographic map and that is correlated with the identified geographic location of the recreational user activity; and drives the display screen to cause the populated animated content object to present to a viewer of the electronic cartographic map live-action video or an animation representation of the recreational user activity, wherein the recreational user activity is selected from the group consisting of hiking, climbing, golfing, sky diving, skiing, skating, fishing, swimming, tubing, rafting, canoeing, kayaking and boating.

12. The system of claim 11, wherein the populated animated content object presents the live-action video, the live-action video was acquired at the identified geographic location that is correlated to the area boundaries, and the identified geographic location is located within the area boundaries; and wherein the processor executes the program instructions stored on the computer-readable storage medium via the computer readable memory and thereby further defines the area boundaries as coextensive with and inclusive of a range of geotagging coordinates of a plurality of images of the collected animated content data that were acquired at the identified geographic location of the recreational user activity.

13. The system of claim 11, wherein the processor executes the program instructions stored on the computer-readable storage medium via the computer readable memory and thereby further:

populates the electronic cartographic map with a plurality of different selectable animated content objects that comprises the selectable animated content object, wherein each of the plurality of different selectable animated content objects are populated at different boundaries for different areas depicted within the electronic cartographic map and that are correlated with different identified geographic locations of different ones of the recreational user activities; and drives the display screen to cause the populated animated content object to present to a viewer of the electronic cartographic map the populated plurality of different selectable animated content objects each presenting live-action videos of the different recreational user activities.

14. The system of claim 11, wherein the processor executes the program instructions stored on the computer-readable storage medium via the computer readable memory and thereby further:

limits results returned in satisfaction of the searching of the stored correlated boundaries for areas that are depicted within the electronic cartographic map and have boundaries that are correlated to the identified geographic location of the recreational user activity to activities that occur during a specified time, time period or season.

15. The system of claim 11, wherein the processor executes the program instructions stored on the computer-readable storage medium via the computer readable memory and thereby further:

generates the electronic cartographic map presented to the viewer with the populated animated content object to depict the boundaries for the area in correlation to the identified geographic location of the recreational user activity at a time of season during which the user activity is available for participation by the user within the depicted boundaries; and populates the electronic cartographic map with the selectable animated content object by filtering activities available to satisfy the selected recreational user activity as a function of an age or physical ability of the user.

16. A computer program product for selection and display of context-based animated objects and streaming video content display within an electronic map presentation, the computer program product comprising:

a computer readable storage medium having computer readable program code embodied therewith, the computer readable program code comprising instructions for execution by a processor that cause the processor to:

collect animated content data from a network data source, wherein the collected animated content data is selected from the group consisting of live-action video of a location-based recreational user activity, and animation representations of the location-based recreational user activity;

extract location context data from the collected animated content data, wherein the location context data identifies a geographic location of the recreational user activity that is depicted within the collected animated content data live-action video or animation representations;

correlate boundaries of an area within an electronic cartographic map with the identified geographic location of the recreational user activity and a determined type of the recreational user activity depicted within the collected animated content data live-action video or animation representations; and store the correlated boundaries in a storage device for use in plotting location of the collected animated content data live-action video or animation representations at the correlated area boundaries within a presentation of the electronic cartographic map on a programmable device display screen.

17. The computer program product of claim 16, wherein the computer readable program code instructions for execution by the processor further cause the processor to:

in response to a query for display of the recreational user activity within the electronic cartographic map, search the stored correlated boundaries for areas that are depicted within the electronic cartographic map and have boundaries that are correlated to the identified geographic location of the recreational user activity;

populate the electronic cartographic map with a selectable animated content object at the boundaries for the area that is depicted within the electronic cartographic map and that is correlated with the identified geographic location of the recreational user activity; and drive the display screen to cause the populated animated content object to present to a viewer of the electronic cartographic map live-action video or an animation representation of the recreational user activity, wherein the recreational user activity is selected from the group consisting of hiking, climbing, golfing, sky diving, skiing, skating, fishing, swimming, tubing, rafting, canoeing, kayaking and boating.

18. The computer program product of claim 17, wherein the populated animated content object presents the live-action video, the live-action video was acquired at the identified geographic location that is correlated to the area boundaries, and the identified geographic location is located within the area boundaries; and wherein the computer readable program code instructions for execution by the processor further cause the processor to define the area boundaries as coextensive with and inclusive of a range of geotagging coordinates of a plurality of images of the collected animated content data that were acquired at the identified geographic location of the recreational user activity.

19. The computer program product of claim 17, wherein the computer readable program code instructions for execution by the processor further cause the processor to:

populate the electronic cartographic map with a plurality of different selectable animated content objects that comprises the selectable animated content object, wherein each of the plurality of different selectable animated content objects are populated at different boundaries for different areas depicted within the electronic cartographic map and that are correlated with different identified geographic locations of different ones of the recreational user activities; and drive the display screen to cause the populated animated content object to present to a viewer of the electronic cartographic map the populated plurality of different selectable animated content objects each presenting live-action videos of the different recreational user activities.

20. The computer program product of claim 17, wherein the computer readable program code instructions for execution by the processor further cause the processor to:

limit results returned in satisfaction of the searching of the stored correlated boundaries for areas that are depicted within the electronic cartographic map and have boundaries that are correlated to the identified geographic location of the recreational user activity to recreational activities that occur during a specified time, time period or season.

\* \* \* \* \*